United States Patent
Giles

(10) Patent No.: US 6,208,696 B1
(45) Date of Patent: Mar. 27, 2001

(54) LOW POWER DENSITY RADIO SYSTEM

(75) Inventor: Terence George Giles, Purley (GB)

(73) Assignee: Ramar Technology Limited, Croyden (GB)

( * ) Notice: Subject to any disclaimer, the term of this patent is extended or adjusted under 35 U.S.C. 154(b) by 0 days.

(21) Appl. No.: 08/989,981

(22) Filed: Dec. 12, 1997

(30) Foreign Application Priority Data

Oct. 7, 1997 (GB) .................................................. 9721247

(51) Int. Cl.$^7$ .......................... H04L 25/06; H04L 27/10; H04L 27/14
(52) U.S. Cl. .......................... 375/272; 375/317; 375/334; 329/300
(58) Field of Search .................................... 375/334, 317, 375/319, 364, 365, 368, 369, 272, 275, 278, 303, 335, 259; 340/870, 870.02; 329/300; 327/50, 94, 91; 455/214, 337

(56) References Cited

U.S. PATENT DOCUMENTS

| | | |
|---|---|---|
| 4,318,128 | 3/1982 | Sauvanet . |
| 4,873,702 | 10/1989 | Chiu . |
| 4,897,857 | 1/1990 | Wakatsuki .......................... 375/317 |
| 4,929,851 | 5/1990 | Pace .......................... 327/73 |
| 5,027,352 | 6/1991 | Goode . |
| 5,274,672 | * 12/1993 | Weiss .......................... 375/274 |
| 5,319,679 | * 6/1994 | Bagby .......................... 375/354 |
| 5,481,259 | * 1/1996 | Bane .......................... 340/870.03 |
| 5,483,193 | 1/1996 | Kennedy .......................... 329/300 |
| 5,617,084 | * 4/1997 | Sears .......................... 340/870.02 |

FOREIGN PATENT DOCUMENTS

| | | |
|---|---|---|
| 0409142 A2 | 1/1991 | (EP) . |
| 0651520 A2 | 3/1995 | (EP) . |
| WO 91/05427 | 4/1991 | (WO) . |
| 95/13675 | 5/1995 | (WO) . |

OTHER PUBLICATIONS

Haykin, Simon; Communication Systems; 1994; John Wiley & Sons; pp. 697–698.*

* cited by examiner

Primary Examiner—Stephen Chin
Assistant Examiner—Betsy L. Deppe
(74) Attorney, Agent, or Firm—Collard & Roe, P.C.

(57) ABSTRACT

A low power density radio system is provided using a simple FSK transmitter arranged to transmit very short bursts to a receiver at predetermined frequent intervals. Such a system can be used between a meter transponder and a reader in an AMR system to eliminate the need for a receiver in the transponder and still achieve extended battery life. The problems of detecting and demodulating the short burst are overcome by using a sample and hold circuit that detects a preamble signal of reversals to indicate the presence of the burst. The sample and hold circuit also provides the reference value to correct for the DC pedestal voltage that arises as a function of the transmitter and receiver frequency errors. The data signal that follows the preamble signal can then be detected, and is followed by a verifying signal as part of the signal burst. The burst signal is repeated at predetermined intervals and is preferably only $\frac{1}{4000}$ or less than the signal time interval.

3 Claims, 2 Drawing Sheets

LOW POWER DENSITY RADIO SYSTEM

BACKGROUND OF THE INVENTION

1. Field of the Invention

The present invention relates to low power density radio systems. In particular, the invention relates to systems suitable for use in the first hop between a meter transponder and a receiver in an automatic meter reading (AMR) system. The system is also suitable for other applications.

2. The Prior Art

It is difficult to find unused radio channels throughout the world. This is particularly true for low power, short range devices (SRD), which operate under license exemption. In many countries, particularly in the United States, the licensing authorities have encouraged the use of various types of spread spectrum modulation devices to allow for the uncoordinated sharing of channels. The normal methods of reducing the power density, and hence interference potential on any channel is to use either frequency hopping (FH), or direct sequence spread spectrum (DSS).

In frequency hopping, the transmitter skips around a series of randomly selected narrow band channels and spends only a short time on any one frequency. For example, FCC Part 15.247 specifies the use of a minimum of 50 channels, with a maximum time of 0.4 seconds spent on any one channel in a 20 second period. In this way, the average power density on any channel from a given transmitter is reduced to 2% of the power that would be present if it was not channel hopping. The alternative method, DSS, requires that the narrow band carrier be modulated by a high speed pseudo-random sequence, which has the effect of spreading the signal over a wide bandwidth. Again, in FCC Part 15.247, the spreading gain is specified as a minimum of 20 dB with a minimum bandwidth of 500 kHz. Thus, the average power density of a given transmitter is reduced to 1% or less.

AMR is a low power, low cost radio system that allows utility meters to be read from receivers that are hand held or in mobile computers. A radio device, normally referred to as a transponder, is attached to the meter, so that it can either count pulses or access the meter's internal registers. The transponder is then interrogated, i.e., activated by the reader, so as to send the desired information to the reader. The transponder will then be deactivated until the next interrogation sequence. The major problem with this approach is the high cost, both in terms of the components used and power consumed by the receiver in the transponder.

Low power density is particularly significant for AMR since the meter transponder is required to be a low maintenance and reliable device. For electric meters, the power supplied is not a problem. However, for transponders used with water, gas or other non-electric utilities, it is generally necessary for the transponder to be battery powered. This requires that continuous power consumption be kept in the 10–20 $\mu$A range. A low power density operation therefore enables long battery life.

The approach taken by most AMR systems for non-electric meters is to provide a transponder that responds to a wake-up signal and can therefore be powered down for long periods of time. The use of a wake-up signal requires the transponder to have a receiver. This considerably increases the cost and complexity of the transponder. Prior art solutions also use spread spectrum devices to achieve low power density.

SUMMARY OF THE INVENTION

The invention provides a device for reducing the average power density by occupying the target channel for only a very short time. In the proposed system, the transmission will last only 1 mS and occur not more frequently than every 4 seconds. This represents an average power density of only 0.025% as compared with a continuous transmission. In the past, it has been technically difficult to limit transmissions to only 1 mS because of problems in detecting the presence of this signal, locking on to it so that tuning errors are eliminated and allowing the clock and then the data to be recovered. The method of detecting the presence of the required signal and removing the tuning errors is described below.

Contrary to the power saving teachings of the prior art, the present invention provides a low power density transmitter in the transponder that repeatedly transmits short data bursts containing the meter reading data. In this invention, no receiver is needed. In a preferred embodiment, the meter sends its short burst of data every 4 seconds. The average current consumption of the meter radio transponder will be approximately 1/4000 of the peak transmitter current. This means that the target battery consumption can be easily achieved. This eliminates the need for a wake-up signal receiver.

By suitable selection of the period between bursts, it can be ensured that at least one burst will be present when the receiver is within range of the transponder. Because the low power density is achieved by very short bursts, it is not necessary to use spread spectrum solutions, further reducing the complexity of the transponder circuitry.

The specific embodiment of the invention described relates to its use in an AMR transponder. However, there are other possible applications for such a low power density radio systems. These include data transmissions from parking meters and traffic information data collection transponders on the roadside. Industrial uses in manufacturing and process control may also be found.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
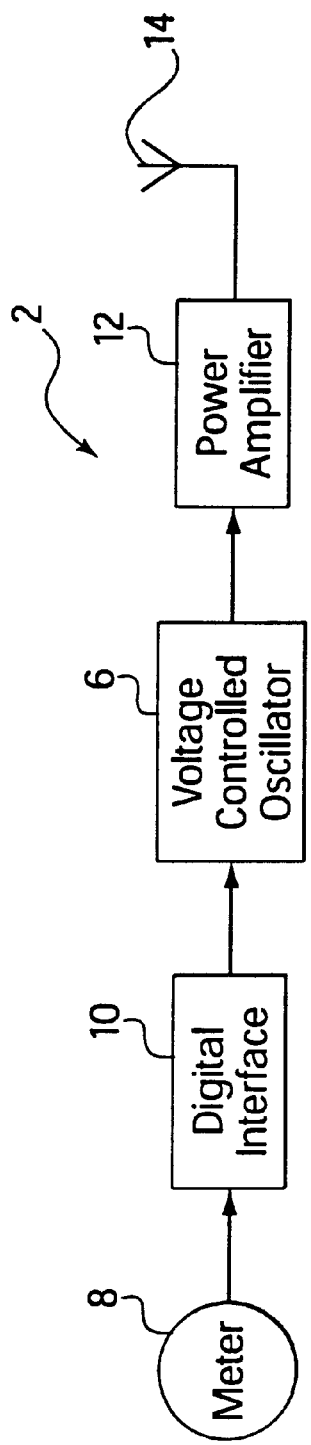
FIG. 1 is a block diagram of a transmitter for use in a transponder.
Figure 2:
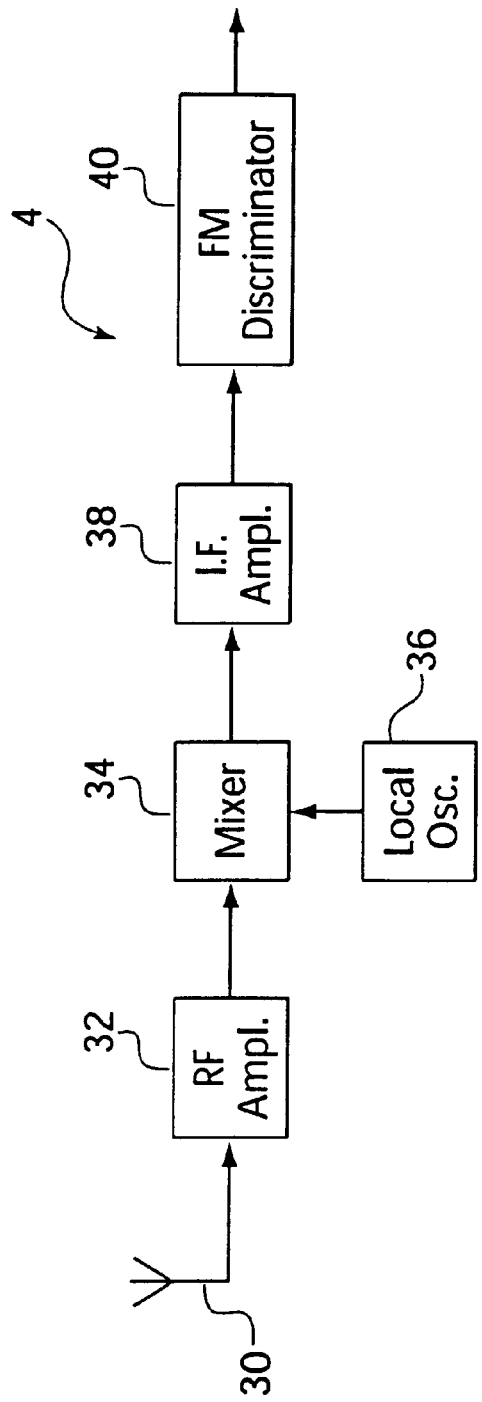
FIG. 2 is a block diagram of a receiver.

Referring now in detail to the drawings and, in particular, FIGS. 1 and 2, there is shown a radio system having a transmitter 2 and receiver 4. The transmitter and receiver are conventional and designed for simplicity. A short burst transmitter 2 is based on a voltage controlled oscillator 6 such as a surface acoustic wave (SAW) oscillator or a phase locked loop (PLL) that can be directly modulated to produce FSK modulation.

As shown in FIG. 1, the transmitter 2 is associated in this embodiment with a meter 8 that provides the data to be transmitted via a digital interface 10. Digital interface 10 provides the modulation voltage input to oscillator 6. The output of oscillator 6 is fed via a power amplifier 12 to a transmitter antenna 14.

The simplest method of sending the data from meter 8 is by directly frequency modulating the transmitter carrier. Unfortunately, the data could contain long periods of logic 1 or logic 0 and so the center or reference point of the data would not be found by simple integration. The normal method of overcoming this problem is to use some form di-bit or Manchester encoding, so that each data bit is represented by two bitlets, where, for example, a logic 1 is coded as 01 and a logic 0 as 10. In this way, there will always be an equal number of 1s and 0s in the radio transmission, so the reference point can be found by integrating over a number of bits.

Figure 4:
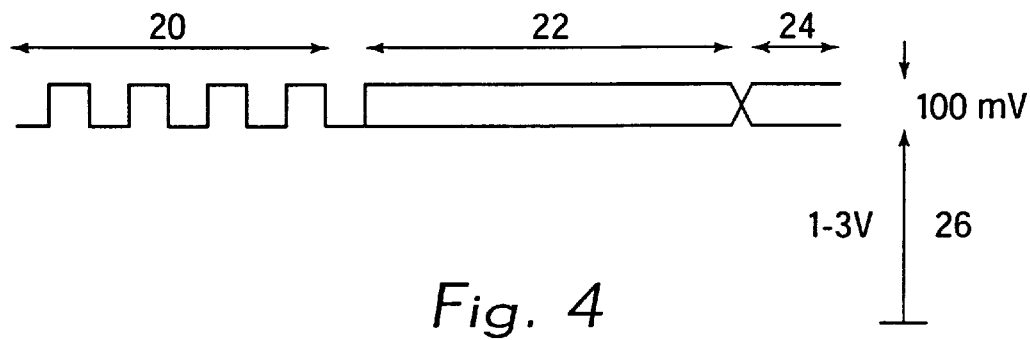
FIG. 4 is a diagram illustrating a data burst as transmitted.

The disadvantage is that for a given data rate, the transmission will then take twice as long, as each data bit is represented by two modulation bits. Accordingly, the problem of finding the center or slicing point of the data in this embodiment is overcome by using a short burst data structure or sequence as shown in FIG. 4. The first part of the burst is a preamble portion 20 consisting of, for example, 32 alternating 1s and 0s, then the data block 22, which is followed by a Cyclic Redundancy Check (CRC) 24, to allow the accuracy of the data to be verified.

The receiver 4 as shown in FIG. 2 is a simple single or multiple conversion superhet with a frequency discriminator. As shown, a receiver antenna 30 feeds a signal to an RF amplifier 32, which supplies one input of a mixer 34 supplied by a local oscillator 36. An IF amplifier 38 selects the difference signal at the IF and feeds it to an FM discriminator 40. This type of receiver is essentially conventional.

A typical signal from discriminator 40 is shown in FIG. 4. This signal consists of a small AC_signal of typically 100 mV peak to peak, corresponding to the transmitted burst previously described, sitting on a DC base voltage 26 of between 1 and 3V which will vary as a function of the transmitter and receiver frequency errors. In general, the DC voltage 26 will be stable during a particular transmission, but will be different for each individual transmitter and also vary with time and ambient temperatures.

This base voltage 26 arises as a result of using simple direct frequency shift keying. Traditional methods of eliminating this variable pedestal are to either use very high stability oscillators in the transmitter and receiver, which is expensive, or to apply some form of automatic frequency control (AFC). Unfortunately, with short bursts there is not sufficient time available for an AFC system to settle accurately.

Figure 3:
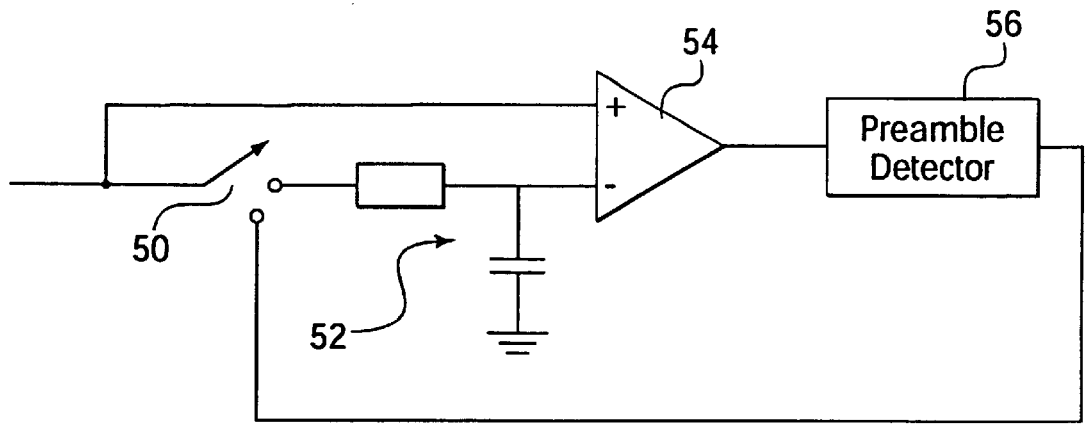
FIG. 3 is a diagram of a sample and hold circuit for use in the receiver to find the mid-point of the data.

The problem of detecting the signal and removing any frequency errors is achieved by a novel sample and hold circuit in the demodulator as shown in FIG. 3. The sample and hold circuit comprises a transmission gate switch 50, an RC integrator 52, a comparator 54 and a shift register preamble detector 56. Initially in a first operating mode, switch 50 will be closed and so the incoming signal will be integrated and applied to the comparator −ve input, and will also be applied directly to the +ve input of comparator 54. The time constant of the integrator 52 is arranged to be about 4–8 bit periods long at the anticipated data rate. When no signal is present, the integrated voltage will be a function of receiver output noise.

Any received preamble 20 will be integrated to its correct average value because of the equal population of is and 0s in the transmission. This means that an accurate logic level preamble will appear at the output of comparator 54, because the instantaneous signal applied to the comparator +ve input will be compared with the accurate average on the −ve input.

This eliminates the base or pedestal voltage 26. The preamble detector 56 is arranged to sense approximately 16 bits of the reversals at which point it opens the sample gate switch 50. The detector now goes into a hold mode so that the accurate average voltage derived during the preamble is used as the comparator reference during the following data 22 and CRC 24. As the voltage is held from the preamble, any asymmetry in the data or CRC will have no effect on the demodulator. At the end of the data burst, switch 50 is again closed and a new preamble acquisition is started.

This sample and hold circuit can readily be implemented in a relatively low cost ASIC chip, making the receiver design inexpensive and compact and therefore suitable for hand-held reader applications.

Figure 5:
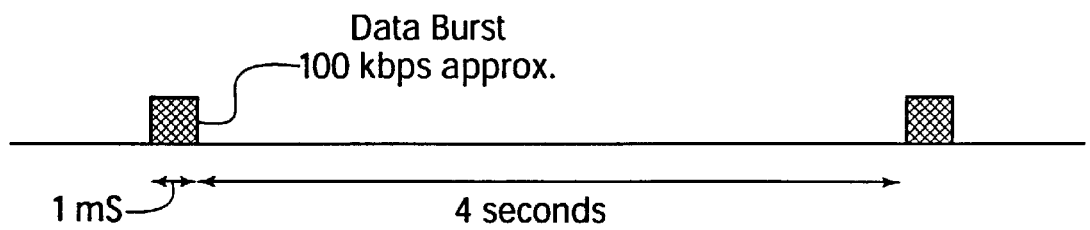
FIG. 5 is a diagram showing the transmission pattern of data bursts when used in an AMR pseudo-interrogate mode.

For use in an AMR, the data 22 can have any desired packet structure. In a pseudo-interrogation mode, this system can be used to replace transponders and readers that normally require an interrogate signal to activate the transponder. The data burst shown in FIG. 4 can be transmitted once every 4 seconds as shown in FIG. 5. The data burst lasts only 1 mS and carries data at approximately 100 kbps.

The same radio system can also be used in slower modes with less frequent transmissions of longer data bursts. This is particularly suitable for simple fixed networks, such as are required for sub water metering. It will be appreciated that the length and frequency of the bursts can be chosen in a suitable manner for the application in order to keep the power density within the required constraints.

Accordingly, while only a single embodiment of the present invention has been shown and described, it is obvious that many changes and modifications may be made thereunto without departing from the spirit and scope of the invention.

What is claimed is:

1. A low power density radio system comprising:

a transmitter having a digital data interface for providing an intermittent short burst signal to an FSK modulator wherein said intermittent short burst signal at said digital data interface includes a preamble portion having an equal number of 1's and 0's followed by data to be transmitted and wherein said intermittent short burst signal is of the order of magnitude of 1 mS in duration; and a receiver comprising means for detecting an average signal level of the preamble of a received intermittent short burst signal and comparing a set of data levels in said received intermittent short burst signal with said average signal level to demodulate the transmitted data in said received intermittent short burst signal.

2. A low power density radio system as claimed in claim 1, wherein the transmitter is disposed in a receiverless transponder for use in an AMR system and wherein the intermittent short burst signal includes meter reading data and the intermittent short burst signal is transmitted no more often than every 4 seconds in order to achieve a low power density.

3. The radio system as claimed in claim 1, wherein the detecting means comprises a sample and hold circuit comprising:
- a comparator having first and second inputs, and
- an integrator having an input and an output connected to said first input of said comparator,
- said sample and hold circuit being operable in a first mode wherein a demodulated signal is fed to both the integrator input and the second comparator input to detect the presence of said preamble portion, and a second hold mode in which the demodulated signal is fed to the second comparator input, and the first input is held at the last integrated value to detect data following said preamble portion.

* * * * *